(12) United States Patent
Ilvessalmi et al.

(10) Patent No.: US 10,134,011 B2
(45) Date of Patent: Nov. 20, 2018

(54) METHODS AND APPARATUSES FOR FACILITATING LOCATION SELECTION

(75) Inventors: Tomi Erik Ilvessalmi, Espoo (FI); Rosalinde Belzer, Helsinki (FI); Katri Laakso, Tampere (FI); Roope Rainisto, Helsinki (FI); Jan Krebber, Tampere (FI)

(73) Assignee: Nokia Technologies Oy, Espoo (FI)

( * ) Notice: Subject to any disclaimer, the term of this patent is extended or adjusted under 35 U.S.C. 154(b) by 97 days.

(21) Appl. No.: 12/715,899

(22) Filed: Mar. 2, 2010

(65) Prior Publication Data

US 2011/0219328 A1 Sep. 8, 2011

(51) Int. Cl.
*G06Q 10/10* (2012.01)
*H04W 64/00* (2009.01)
*G06F 3/048* (2013.01)
*G06F 17/30* (2006.01)
*H04M 1/725* (2006.01)

(52) U.S. Cl.
CPC .......... *G06Q 10/109* (2013.01); *G06F 3/048* (2013.01); *G06F 17/30* (2013.01); *H04M 1/72566* (2013.01); *H04M 1/72572* (2013.01); *H04W 64/003* (2013.01)

(58) Field of Classification Search
CPC ................ H04W 64/003; H04W 4/028; G06F 17/30873; G06F 17/30; G06F 3/048; G06Q 10/109; H04M 1/72566
USPC ......................................... 715/810, 764, 780
See application file for complete search history.

(56) References Cited

U.S. PATENT DOCUMENTS

| | | | |
|---|---|---|---|
| 6,064,975 | A | 5/2000 | Moon et al. |
| 6,563,459 | B2 | 5/2003 | Takenaga |
| 2002/0163547 | A1* | 11/2002 | Abramson ........... G01C 21/367 715/855 |
| 2003/0120526 | A1 | 6/2003 | Altman et al. |
| 2003/0182052 | A1* | 9/2003 | DeLorme et al. ............ 701/201 |
| 2005/0268254 | A1 | 12/2005 | Abramson et al. |
| 2008/0045138 | A1* | 2/2008 | Milic-Frayling et al. ... 455/3.04 |
| 2008/0086455 | A1* | 4/2008 | Meisels ................. G01C 21/26 |
| 2008/0109718 | A1* | 5/2008 | Narayanaswami .. G06Q 10/109 715/262 |
| 2008/0195638 | A1 | 8/2008 | Winberry et al. |

(Continued)

FOREIGN PATENT DOCUMENTS

| CN | 1252573 A | 5/2000 |
|---|---|---|
| CN | 1277692 A | 12/2000 |

(Continued)

OTHER PUBLICATIONS

*Outlook: Managing Your Time*, Academic Computing Services, A Division of Information Services, University of Kansas, (2004), pp. 1-36.

(Continued)

*Primary Examiner* — Sherrod Keaton
(74) *Attorney, Agent, or Firm* — Alston & Bird LLP

(57) ABSTRACT

Methods and apparatuses are provided for facilitating location selection. A method may include causing display of a user interface for selecting a location associated with a calendar entry. The method may further include determining a location selected via the user interface. The method may additionally include associating the determined location with the calendar entry. Corresponding apparatuses are also provided.

20 Claims, 6 Drawing Sheets

(56) References Cited

U.S. PATENT DOCUMENTS

| | | | |
|---|---|---|---|
| 2009/0006994 A1 | 1/2009 | Forstall et al. | |
| 2009/0100018 A1* | 4/2009 | Roberts | G06F 17/30241 |
| 2009/0100363 A1 | 4/2009 | Pegg et al. | |
| 2009/0210388 A1* | 8/2009 | Elson | G06F 17/30241 |
| 2010/0030612 A1 | 2/2010 | Kim et al. | |
| 2010/0082239 A1* | 4/2010 | Hardy | G01C 21/26 701/532 |
| 2010/0159967 A1* | 6/2010 | Pounds et al. | 455/466 |
| 2010/0185391 A1* | 7/2010 | Lee | G06F 17/3087 701/532 |
| 2014/0108446 A1 | 4/2014 | Djabarov | |

FOREIGN PATENT DOCUMENTS

| | | |
|---|---|---|
| CN | 101395604 A | 3/2009 |
| JP | 2002/117195 A | 4/2002 |
| JP | 2005-228020 A | 8/2005 |
| JP | 2006/113744 A | 4/2006 |
| JP | 2008-187388 A | 8/2008 |

OTHER PUBLICATIONS

International Search Report and Written Opinion for Application No. PCT/FI2011/050113 dated Jun. 16, 2011.

Extended European Search Report for Application No. 11750236 dated Aug. 9, 2013.

Office Action for Japanese Application No. 2012-555455 dated Jan. 15, 2015.

Office Action for Chinese Application No. 201180022086.2 dated Apr. 1, 2015.

Office Action for corresponding Japanese Application No. 2012-555455 dated Dec. 18, 2015.

Atsuo, Watanabe, *Schduler with GPS and alarm functions*, Sony technical report, No. 2005-0221, Sony Corporation, May 10, 2005, vol. 14, No. 5.

Donfest, Rael, et al. *Google Hacks*, O'Reilly Japan Inc. Apr. 25, 2007, 329-334.

Suzumari, *Ways for managing online schedules—using mobile phones for inputting*, PC Japan, Jul. 1, 2008, vol. 13, No. 7, 88-93.

Office Action for corresponding European Application No. 11750236.9 dated Sep. 10, 2015.

Office Action for Japanese Application No. 2012-555455 dated Mar. 30, 2016.

Notice of Allowance for Japanese Application No. 2012-555455 dated Jun. 6, 2016.

Summons to attend oral proceedings pursuant to Rule 115(1) EPC for European Application No. 11750236.9 dated Jul. 19, 2017, 8 pages.

"Xilinus Blog;" http://blog.xilinus.com; Mar. 2, 2010.

"Ajaxian >>AddressChooser: address picker in real-time," DHTML for the 21$^{st}$ Century; http://ajaxian.com/archives/addresschooser; Mar. 3, 2010.

* cited by examiner

METHODS AND APPARATUSES FOR FACILITATING LOCATION SELECTION

TECHNOLOGICAL FIELD

Embodiments of the present invention relate generally to location selection technology and, more particularly, some example embodiments relate to methods, and apparatuses for facilitating selection of locations associated with calendar entries.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used for execution of a wide range of applications.

One category of application used by many computing device users is a calendar application. Users may use a calendar application to maintain their personal event schedule. In this regard, a calendar application may allow a user to create and manage calendar entries, which comprise information about events on the user's schedule. Such events may include, for example, meetings, appointments, dates, parties, dinner meet-ups, sporting events, and/or any other event which the user has scheduled to attend or otherwise participate in.

BRIEF SUMMARY

Methods, apparatuses, and computer program products are herein provided for facilitating location selection. Systems, methods, apparatuses, and computer program products in accordance with various embodiments may provide several advantages to computing devices and computing device users. Example embodiments provide a user intuitive interface for facilitating user selection of a location. More particularly, some example embodiments of the invention provide a user interface for facilitating selection of a location associated with a calendar entry. In this regard, such example embodiments of the invention provide an interface allowing a user to select a location at which an event scheduled in a user's calendar is to occur. In some example embodiments, a user interface is provided that allows a user to select a location for an event by selecting a location from a list of recently used locations. Such embodiments may facilitate quicker selection of a location associated with recurring events or the like that may occur at the same location. In some example embodiments, a user interface is provided that allows a user to search for a location using an input field for inputting a search term. Such example embodiments may, for example, allow a user to select a location when a user knows a name of a location, but not the address or position coordinates of the location. Some example embodiments provide a user interface allowing a user to select a location by selecting a location on a map. Still further embodiments provide one or more user interfaces allowing a user to select a location using two or more of the above selection methods. Accordingly, a user may select a preferred method of selecting a location and/or a method of selecting a location that best suits the particular event for which the user is selecting an associated location.

Some example embodiments provide a user interface for selecting a location that is tightly integrated with creation and/or modification of a calendar entry. In this regard, some example embodiments of the invention are configured to provide a user interface for selecting a location in response to creation and/or modification of a calendar entry by a user. Such example embodiments may allow a user to easily define a location associated with an event when creating the event. Some example embodiments additionally provide directions to an event based on the location associated with the event.

In a first example embodiment, a method is provided, which comprises causing display of a user interface for selecting a location associated with a calendar entry. The method of this embodiment further comprises determining a location selected via the user interface. The method of this embodiment additionally comprises associating the determined location with the calendar entry.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least cause display of a user interface for selecting a location associated with a calendar entry. The at least one memory and stored computer program code are configured, with the at least one processor, to further cause the apparatus of this embodiment to determine a location selected via the user interface. The at least one memory and stored computer program code are configured, with the at least one processor, to additionally cause the apparatus of this embodiment to associate the determined location with the calendar entry.

In another example embodiment, a computer program product is provided. The computer program product of this embodiment includes at least one computer-readable storage medium having computer-readable program instructions stored therein. The program instructions of this embodiment comprise program instructions configured to cause display of a user interface for selecting a location associated with a calendar entry. The program instructions of this embodiment further comprise program instructions configured to determine a location selected via the user interface. The program instructions of this embodiment additionally comprise program instructions configured to associate the determined location with the calendar entry.

In another example embodiment, an apparatus is provided that comprises means for causing display of a user interface for selecting a location associated with a calendar entry. The apparatus of this embodiment further comprises means for determining a location selected via the user interface. The apparatus of this embodiment additionally comprises means for associating the determined location with the calendar entry.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
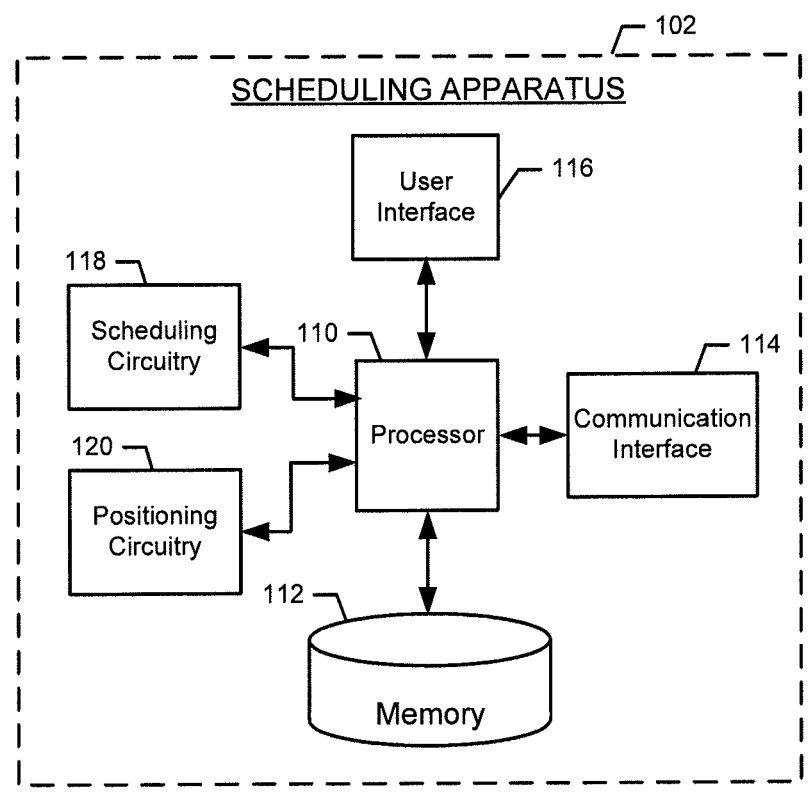
FIG. 1 illustrates a block diagram of an animation apparatus for facilitating location selection according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a scheduling apparatus 102 for facilitating location selection according to an example embodiment of the present invention. It will be appreciated that the scheduling apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of a scheduling apparatus for facilitating location selection, numerous other configurations may also be used to implement embodiments of the present invention.

The scheduling apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the scheduling apparatus 102 is embodied as a mobile terminal, such as that illustrated in FIG. 2.

Figure 2:
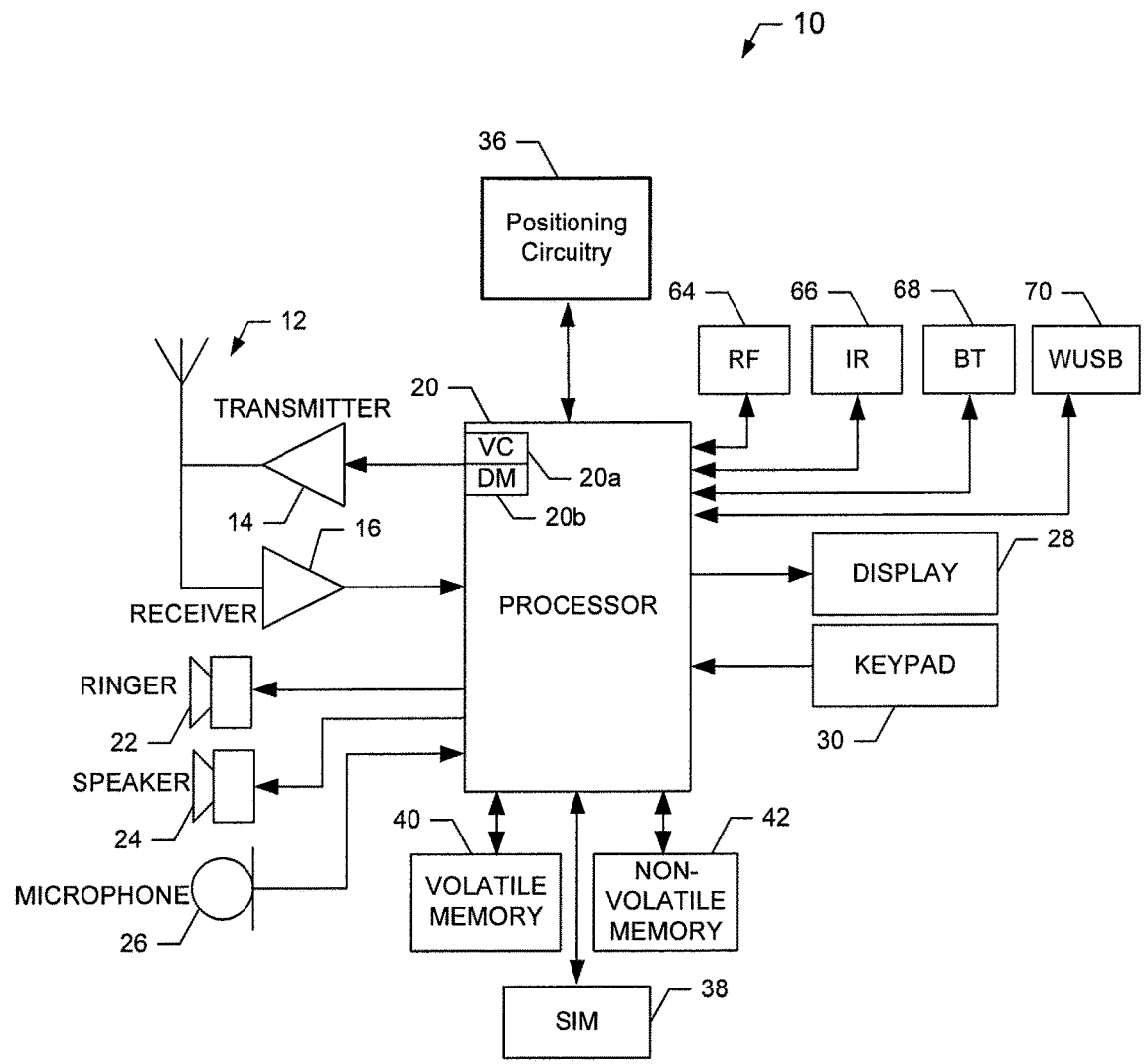
FIG. 2 is a schematic block diagram of a mobile terminal according to an example embodiment of the present invention.

In this regard, FIG. 2 illustrates a block diagram of a mobile terminal 10 representative of one embodiment of a scheduling apparatus 102. It should be understood, however, that the mobile terminal 10 illustrated and hereinafter described is merely illustrative of one type of scheduling apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may include positioning circuitry 36. The positioning circuitry 36 may include, for example, a global positioning system (GPS) sensor, an assisted global positioning system (Assisted-GPS) sensor, and/or the like. In one embodiment, however, the positioning circuitry 36 includes a pedometer or inertial sensor. Further, the positioning circuitry 36 may be configured to determine the location of the mobile terminal based upon signal triangulation or other mechanisms. The positioning circuitry 36 is configured in some embodiments to determine a location of the mobile terminal, such as latitude and longitude coordinates of the mobile terminal or a position relative to a reference point such as a destination or a start point. Information from the positioning circuitry 36 may be communicated to a memory of the mobile terminal or to another memory device to be stored as a position history or location information. Furthermore, the memory of the mobile terminal may store instructions for determining cell id information. In this regard, the memory may store an application program for execution by the controller 20, which determines an identity of the current cell, e.g., cell id identity or cell id information, with which the mobile terminal is in communication. In conjunction with the positioning circuitry 36, the cell id information may be used to more accurately determine a location of the mobile terminal.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the scheduling apparatus 102 includes various means, such as a processor 110, memory 112, communication interface 114, user interface 116, scheduling circuitry 118, and positioning circuitry 120 for performing the various functions herein described. These means of the scheduling apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the scheduling apparatus 102 as described herein. The plurality of processors may be embodied on a single computing device or distributed across a plurality of computing devices collectively configured to function as the scheduling apparatus 102. In embodiments wherein the scheduling apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the scheduling apparatus 102 to perform one or more of the functionalities of the scheduling apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the scheduling apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the scheduling apparatus 102 is embodied as a mobile terminal 10, the memory 112 may comprise the volatile memory 40 and/or the non-volatile memory 42. The memory 112 may be configured to store information, data, applications, instructions, or the like for enabling the scheduling apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, calendar entries, locations associated with calendar entries, location information, map(s), and/or the like. This stored information may be stored and/or used by the scheduling circuitry 118 and/or positioning circuitry 120 during the course of performing their respective functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity. For example, the communication interface 114 may be configured to communicate with a server, network node, user terminal, and/or the like over a network for purposes of accessing navigation services, accessing calendar entries, providing access to navigation services, providing access to calendar entries, and/or the like. As another example, in embodiments wherein the scheduling apparatus 102 comprises a server, network node, or the like, the communication interface 114 may be configured to communicate with a remote user terminal (e.g., the user terminal 304) to allow a user of the remote user terminal to access functionality provided by the scheduling apparatus 102. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the scheduling apparatus 102 and one or more computing devices are in communication. The communication interface 114 may additionally be in communication with the memory 112, user interface 116, scheduling circuitry 118, and/or positioning circuitry 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the scheduling apparatus 102 is embodied as one or more servers, aspects of the user interface 116 may be reduced or the user interface 116 may even be eliminated. The user interface 116 may be in communication with the memory 112, communication interface 114, and/or scheduling circuitry 118, such as via a bus.

The scheduling circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the scheduling circuitry 118 is embodied separately from the processor 110, the scheduling circuitry 118 may be in communication with the processor 110. The scheduling circuitry 118 may further be in communication with one or more of the memory 112, communication interface 114, user interface 116, or positioning circuitry 120, such as via a bus.

The positioning circuitry 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the positioning circuitry 120 is embodied separately from the processor 110, the positioning circuitry 120 may be in communication with the processor 110. The positioning circuitry 120 may further be in communication with one or more of the memory 112, communication interface 114, user interface 116, or scheduling circuitry 118, such as via a bus. The positioning circuitry 120 may comprise, for example, a global positioning system (GPS) sensor, an assisted global positioning system (Assisted-GPS) sensor, and/or the like. In one embodiment, the positioning circuitry 120 includes a pedometer or inertial sensor. Further, the positioning circuitry 120 may be configured to determine the location of the scheduling apparatus 102 based upon signal triangulation or other mechanisms. The positioning circuitry 120 is configured in some embodiments to determine a location of the scheduling apparatus 102, such as latitude and longitude coordinates of the scheduling apparatus 102 or a position relative to a reference point such as a destination or a start point. Information from the positioning circuitry 120 may be communicated to the memory 112 or to another memory device to be stored as a position history or location information. In embodiments wherein the scheduling apparatus 102 is embodied as a mobile terminal 10, the positioning circuitry 120 may comprise the positioning circuitry 36. In embodiments wherein the scheduling apparatus 102 is embodied as one or more servers, aspects of the positioning circuitry 120 may be reduced or the positioning circuitry 120 may even be eliminated.

Figure 3:
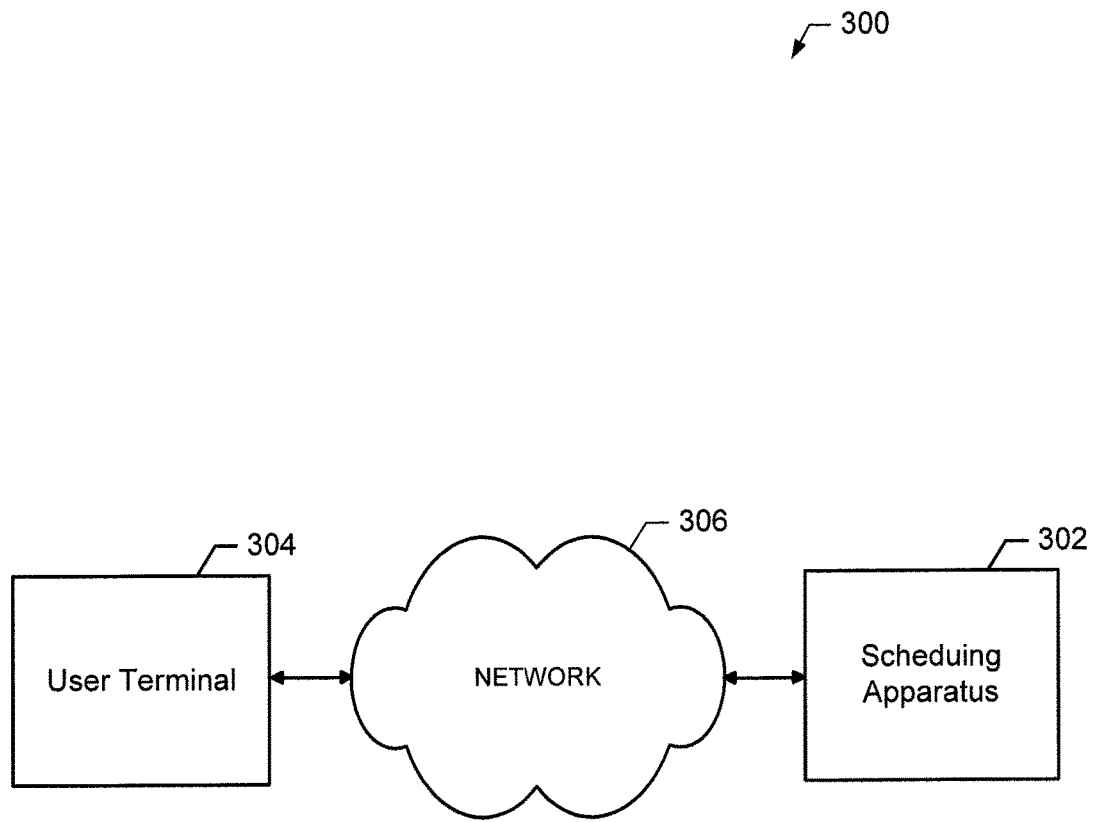
FIG. 3 illustrates a system for facilitating location selection according to an example embodiment of the invention.

FIG. 3 illustrates a system 300 for facilitating location selection according to an example embodiment of the invention. The system 300 comprises a scheduling apparatus 302 and a user terminal 304 configured to communicate over the network 306. The scheduling apparatus 302 may, for example, comprise an embodiment of the scheduling apparatus 102 wherein the scheduling apparatus 102 is embodied as one or more servers, one or more network nodes, or the like that is configured to provide location selection and/or scheduling services to a user of a remote user terminal. The user terminal 304 may comprise any computing device configured to access the network 306 and communicate with the scheduling apparatus 302 in order to access location selection and/or scheduling services provided by the scheduling apparatus 302. The user terminal 304 may, for example, be embodied as a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

In the example system illustrated in FIG. 3, at least some aspects of the user interface 116 may be embodied on the user terminal 304. For example, the scheduling apparatus 302 may be configured to provide a network service, such as a web service, for providing location selection and/or scheduling services to one or more user terminals 304. In this regard, the scheduling apparatus 302 (e.g., scheduling circuitry 118) may be configured to provide a graphical user interface for facilitating location selection and/or event scheduling to the user terminal 304 such that the graphical user interface is caused to be displayed on a display of the user terminal 304. A user of the user terminal 304 may then interact with the graphical user interface to schedule an event, select a location, and/or the like. Therefore, it will be appreciated that where the scheduling circuitry 118 is described to cause a graphical user interface, some other image, data, and/or the like to be displayed, the scheduling circuitry 118 may be causing display on a display operably connected to the scheduling apparatus 102 or may be causing display on a display of a remote user terminal to which data is transmitted over a network. The scheduling apparatus 302 (e.g., scheduling circuitry 118) may be configured to receive at least an indication of a location selected by the user of a user terminal 304 and determine the selected location in accordance with one or more example embodiments described further herein. Accordingly, it will be appreciated that where the scheduling circuitry 118 is described to be configured to determine a user input and/or to make a determination based on user input, the scheduling circuitry 118 may be configured make the determination based on user input to a user interface 116 of the scheduling apparatus 102 or may be configured to make the determination based on a user input to a remote user terminal, an indication of which is transmitted to the scheduling apparatus 102 over a network.

The scheduling circuitry 118 is configured in some example embodiments to cause display of a user interface for selecting a location. The user interface may comprise a user interface for selecting a location associated with a calendar entry. In this regard, the location associated with the calendar entry may comprise a location at which the event which is the subject of the calendar entry is to take place or where the user otherwise needs to be during the event which is the subject of the calendar entry. Accordingly, the scheduling circuitry 118 may be configured to cause display of the user interface in response to creation and/or modification of a calendar entry. Creation and/or modification of a calendar entry may be performed in a calendar or other scheduling application. In this regard, in some example embodiments, the graphical user interface(s) for selecting a location is integrated with the scheduling application in which a calendar entry is created and/or modified.

A user of the scheduling apparatus 102 (or of user terminal 304) may interact with a displayed graphical interface using any input means of the user interface 116. Such input means may comprise, for example, a touch screen display, a mouse, one or more input buttons, one or more soft keys, a keypad, a keyboard, some combination thereof, or the like. Accordingly, a user may utilize an input means to interact with a displayed user interface to select a location associated with a calendar entry. The scheduling circuitry 118 is configured in some example embodiments to determine a location selected by the user. The determined location may comprise an address of a location, name of a location, position coordinates of a location, and/or the like. The scheduling circuitry 118 may be configured to geocode a determined location by determining the position coordinates of a determined location to facilitate the provision of navigational directions to the location.

The scheduling circuitry 118 may be further configured to associate the determined location with a calendar entry for which it was selected. In this regard, the scheduling circuitry 118 may be configured to add the determined location and/or information about the determined location to the calendar entry. For example, the calendar entry may comprise one or more fields for location information and the scheduling circuitry 118 may be configured to populate these field(s) based on the determined location. The scheduling circuitry 118 may cause the updated calendar entry and/or location to be stored in the memory 112.

The user interface(s) displayed to enable selection of a location may comprise various selection and/or input methods to allow a user to select a location. In one example, a displayed user interface may comprise a list of one or more selectable locations. Accordingly, the scheduling circuitry 118 may be configured to determine a location selected from the list.

The one or more locations displayed in the list may be determined by the scheduling circuitry 118 based on any criterion or combination of criteria. For example, the list of one or more selectable locations may comprise a list of one or more locations previously selected for calendar entries. In this regard, the list may comprise a list of recently selected locations, such as locations having been selected by a user for calendar entries within a predefined amount of time. As another example, the list may comprise a list of a predefined number of most recently selected locations. Accordingly, a user may be enabled to quickly select frequently used locations, such as locations that are frequently associated with calendar entries created by the user. Additionally or alternatively, the list of one or more selectable locations may comprise one or more locations frequently visited by the user, as may be determined by the positioning circuitry 120. As a further example, the list of locations may comprise one or more locations recommended to the user. The recommended locations may be recommended based on user interests as detailed in a user profile and/or determined from locations previously selected and/or visited by the user. Additionally or alternatively, the recommended locations may comprise popular locations, such as tourist attractions, popular restaurants, or the like.

As another example location selection method that may be facilitated by a displayed user interface, the user interface may comprise a location input field. In this regard, a user may be enabled to input a location and/or search term into the location input field. For example, a user may be able to enter an address, name of a location, coordinates of a location, and/or other location information into the location input field. The scheduling circuitry 118 may be accordingly configured to determine the location information entered into the location input field.

As another example, the user may be enabled to enter a search term into a location input field. The scheduling circuitry 118 may determine the search term and determine one or more location search results based on the search term. The scheduling circuitry 118 may determine the location search results by determining one or more location search results matching or otherwise corresponding to the search term. For example, the scheduling circuitry 118 may determine addresses, location names, and/or the like that match the search term. As another example, the search term may comprise a location name and the scheduling circuitry 118 may determine one or more addresses, position coordinates, and/or the like corresponding to the location name. The scheduling circuitry 118 may determine the location search results by searching any database of locations. The database may comprise locations previously entered and/or selected by a user, a phone book, address book, directory, and/or other database of locations. In an example embodiment, the scheduling circuitry 118 may be configured to determine and update search results as a user is entering a search term in the location input field. For example, the scheduling circuitry 118 may determine a new set of location search results when the user enters an additional character of the search term. The scheduling circuitry 118 may be further configured to cause at least a portion of the determined location search results to be displayed such that the user may select from the determined location search results. The scheduling circuitry 118 may accordingly be configured to determine a location selected from the search results.

As a further example location selection method that may be facilitated by a displayed user interface, the user interface may comprise a map. A user may interact with the map and select a location on the map. For example, a user may pan and zoom the map, re-center the map, and/or select a location using any appropriate input means, such as may be provided by the user interface 116. When initially displayed, the map may comprise a predefined display radius from a center point determined by the scheduling circuitry 118. The predefined display radius may be defined in a configuration setting, such as accordance with a user preference. The center point may comprise a current location of the scheduling apparatus 102, or user terminal 304, such as may be determined by the positioning circuitry 120. Alternatively, the center point may comprise a location determined based on a residency of the user. For example, the center point may comprise the location of the user's home. Alternatively, the center point may comprise a location in the center of a city, zip code, or the like in which the user resides or is otherwise located. As another example, the center point may comprise a location selected by the user, such as by selecting a location from a list, entering a location in a location input field, or the like.

In some example embodiments, the scheduling circuitry 118 is configured to cause display of a user interface(s) enabling selection of a location using any one or a combination of multiple location selection methods. The multiple location selection methods may comprise any combination of the location selection methods described above. However, it will be appreciated that as the described location selection methods are provided merely for purposes of example, the location selection methods provided by a user interface(s) may comprise one or more additional or alternative location selection methods.

Figure 4:
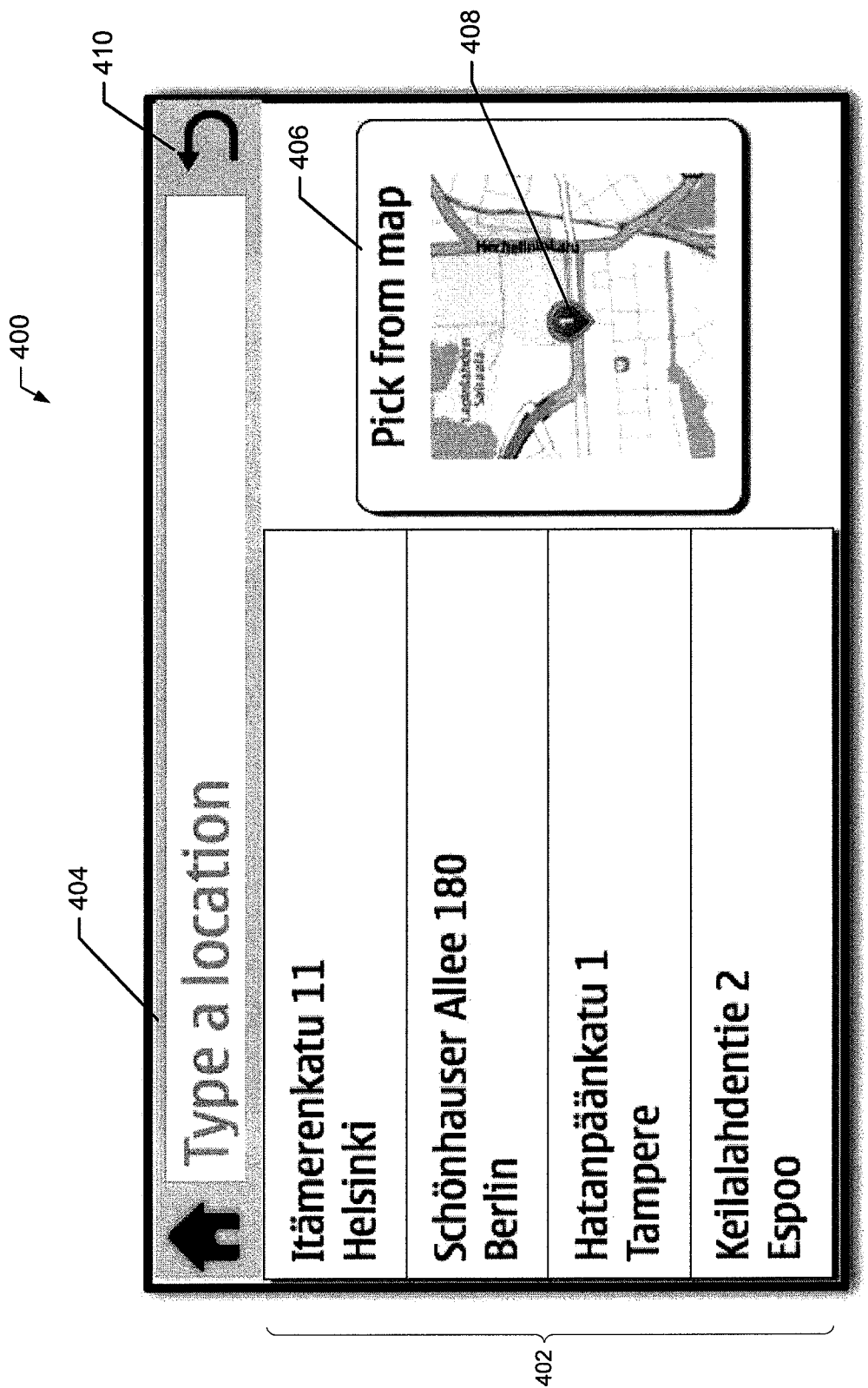
FIG. 4 illustrates a user interface for facilitating location selection according to an example embodiment of the invention.
Figure 5:
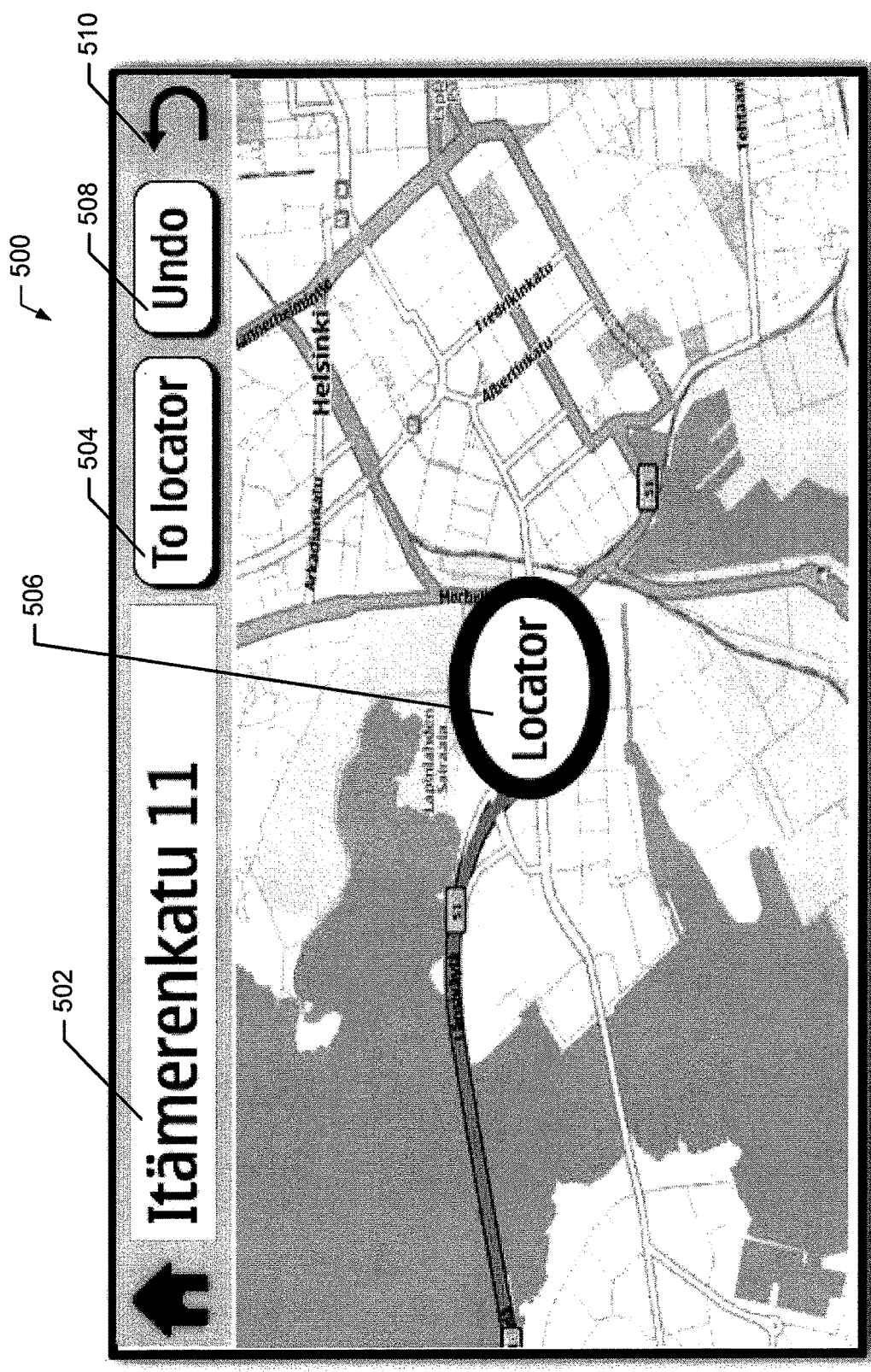
FIG. 5 illustrates a user interface for facilitating location selection according to an example embodiment of the invention.

FIGS. 4 and 5 illustrate example user interfaces for facilitating location selection according to an example embodiment. In this regard, FIG. 4 illustrates a user interface 400 referred to as a "list view." As illustrated, the user interface 400 may comprise a list of selectable locations 402. The locations in the list may be determined based on any criteria, including, for example, any of the various criteria described previously. The user interface 400 may further comprise a location input field 404 in which a user may enter a location, search term, and/or the like. In one example, the locations in the list 402 may be updated by the scheduling circuitry 118 based on an input entered into the location input field 404. A user may accordingly select a location by selecting a location displayed in the list 402. In one example embodiment, the user interface 400 comprises a button 410 for confirming a selection of the location. Thus, for example, when a user selects the button 410, the selected location may be determined by the scheduling circuitry 118, which may associate the determined location with a calendar entry. The scheduling circuitry 118 may be further configured to return to a user interface display of a calendar application or other application which prompted display of the user interface 400, such as in response to the creation or modification of a calendar entry.

The user interface 400 may further comprise a mini map 406. The mini map 406 may display a portion of a map. The portion of the map displayed may, for example, be determined by the scheduling circuitry 118 based at least in part upon a location selected from the list 402. For example, when a user selects a location from the list 402, the scheduling circuitry 118 may be configured to cause display of a portion of a map in the mini map 406 that is centered on the selected location. The mini map 406 may further comprise a location indicator 408 corresponding to the position of a selected location on the mini map 406.

The location indicator 408 or the mini map 406, itself, may comprise a button for selecting a map view user interface. In this regard, a map view user interface may comprise a map display facilitating selection of a location through interaction with the map. The map display may, for example, comprise a larger view of a map portion displayed in the mini map 406. The scheduling circuitry 118 may be configured to cause display of a map view user interface in response to selection of a button for displaying the map view. FIG. 5 illustrates a user interface 500 comprising one example of such a map view user interface.

Referring now to the user interface 500 in FIG. 5, the user interface 500 may display a map. The user interface 500 may further comprise a location input field 502. In this regard, a user may enter an address, location name, and/or the like in the location input field 502. The scheduling circuitry 118 may be configured to determine a location corresponding to an input to the location input field 502 and may cause an indication of the location to be displayed on the map. The scheduling circuitry 118 may be configured to determine the location in response to a further user input comprising a command to mark the location on the map. For example, the user may select the "to locator" button 504. The scheduling circuitry 118 may accordingly be configured to determine a location corresponding to user input to the location input field 502 and cause an indication of the determined location to be displayed on the map in response to selection of the button 504. An example of such an indication of a location is illustrated as the "Locator" 506 displayed in FIG. 5. If a user is not satisfied with the location marked by the locator 506, the user may reposition the locator 506, such as by dragging the locator 506 to another location, clicking or tapping another location on the map, and/or the like. Alternatively, the user may select the "Undo" button 508 to return the locator 506 to the previous location.

If a user is satisfied with the location marked by the locator 506, the user may select the location. In one example embodiment, the user interface 500 comprises a button 510 for confirming a selection of the location. Thus, for example, when a user selects the button 510, the location marked by the locator 506 may be determined by the scheduling circuitry 118. The scheduling circuitry 118 may associate the determined location with a calendar entry. The scheduling circuitry 118 may be further configured to return to a user interface display of a calendar application or other application which prompted display of the user interface 400 and/or 500, such as in response to the creation or modification of a calendar entry.

In some example embodiments, the scheduling circuitry 118 is configured, in combination with the positioning circuitry 120, to provide directions to an event scheduled in a calendar entry. For example, the positioning circuitry 120 may be configured to determine a current position of the scheduling apparatus 102 and the scheduling circuitry 118 may be configured to provide directions from the determined current position to the location associated with a calendar entry.

Some example embodiments additionally provide event reminders based on an estimated time to get to a location associated with a calendar entry. In this regard, the scheduling circuitry 118 and/or positioning circuitry 120 may be configured to determine an estimated time required for a user to get from a current position to the location associated with a calendar entry (e.g., a travel time). The scheduling circuitry 118 may then trigger an advance reminder for a calendar event based on the travel time. Accordingly, such embodiments may use determined route directions to a location associated with a calendar event to trigger an event reminder when the user should leave a current location to arrive at an event on time. In this regard, such embodiments may provide calendar entry reminders that are not just set for a static time (e.g., 15 minutes) in advance of an event regardless of the user's proximity to the location associated with the calendar entry.

Figure 6:
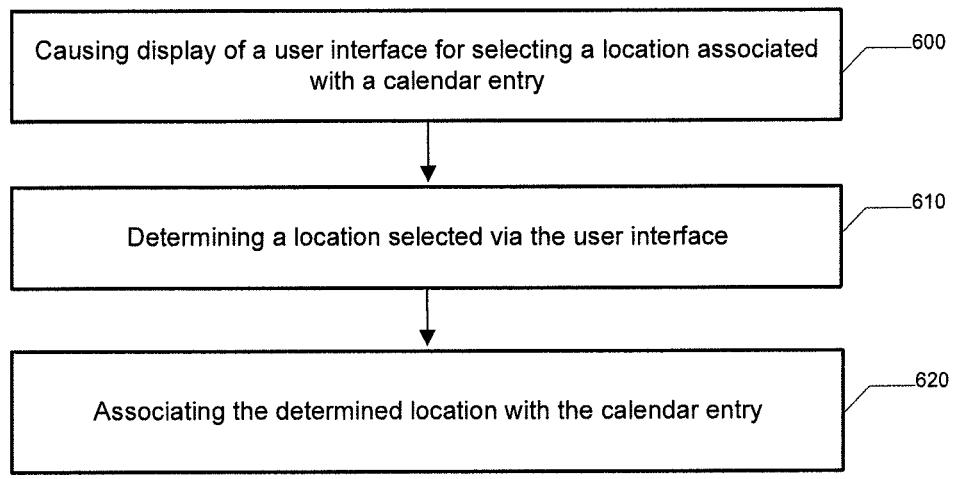
FIG. 6 illustrates a flowchart according to an example method for facilitating location selection according to an example embodiment of the invention.

FIG. 6 illustrates a flowchart according to an example method for facilitating location selection according to an example embodiment of the invention. The operations illustrated in and described with respect to FIG. 6 may, for example, be performed by and/or under the control of one or more of the processor 110, memory 112, communication interface 114, user interface 116, scheduling circuitry 118, or positioning circuitry 120. Operation 600 may comprise causing display of a user interface for selecting a location associated with a calendar entry. Operation 600 may, for example, be performed in response to creation or modification of the calendar entry. Operation 610 may comprise determining a location selected via the displayed user interface. Operation 620 may comprise associating the determined location with the calendar entry.

FIG. 6 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (e.g., the memory 112) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., a scheduling apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (e.g., the processor 110) may provide all or a portion of the elements. In another embodiment, all or a portion of the elements may be configured by and operate under control of a computer program product. The computer program product for performing the methods of embodiments of the invention includes a computer-readable storage medium (e.g., the memory 112), such as the non-volatile storage medium, and computer-readable program code portions, such as a series of computer instructions, embodied in the computer-readable storage medium.

As such, then, some embodiments of the invention provide several advantages to computing devices and computing device users. Example embodiments provide a user intuitive interface for facilitating user selection of a location. More particularly, some example embodiments of the invention provide a user interface for facilitating selection of a location associated with a calendar entry. In this regard, such example embodiments of the invention provide an interface allowing a user to select a location at which an event scheduled in a user's calendar is to occur. In some example embodiments, a user interface is provided that allows a user to select a location for an event by selecting a location from a list of recently used locations. Such embodiments may facilitate quicker selection of a location associated with recurring events or the like that may occur at the same location. In some example embodiments, a user interface is provided that allows a user to search for a location using an input field for inputting a search term. Such example embodiments may, for example, allow a user to select a location when a user knows a name of a location, but not the address or position coordinates of the location. Some example embodiments provide a user interface allowing a user to select a location by selecting a location on a map. Still further embodiments provide one or more user interfaces allowing a user to select a location using two or more of the above selection methods. Accordingly, a user may select a preferred method of selecting a location and/or a method of selecting a location that best suits the particular event for which the user is selecting an associated location.

Some example embodiments provide a user interface for selecting a location that is tightly integrated with creation and/or modification of a calendar entry. In this regard, some example embodiments of the invention are configured to provide a user interface for selecting a location in response to creation and/or modification of a calendar entry by a user. Such example embodiments may allow a user to easily define a location associated with an event when creating the event. Some example embodiments additionally provide directions to an event based on the location associated with the event.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
causing display of a first user interface to facilitate scheduling an event, wherein the first user interface comprises a location input field for selecting a location associated with a calendar entry, wherein the first user interface also comprises a portion of a map based on a location provided via the location input field, wherein causing display of the first user interface comprises causing display of a user interface comprising a selectable list of one or more selectable locations including a predefined number of different locations most recently selected for calendar entries, wherein the first user interface further comprises an indication upon the map of the location provided via the location input field, and wherein the first user interface is configured to concurrently present the location input field, the selectable list, and the portion of the map;
while the first user interface is displayed, receiving user selection of a map view user interface;
in response to the user selection, of the map view user interface, causing display of the map view user interface that includes a larger and a differently positioned view of the portion of the map than displayed by the first user interface, wherein causing display of the map view user interface comprises causing display of the larger and differently positioned view of the portion, of the map without display of the list of one or more selectable locations;
while the map view user interface is displayed, receiving user input as a result of user interaction with the portion of the map that is displayed by the map view user interface and causing the indication to be repositioned upon the map displayed by the map view user interface in response to the user input such that the indication is moved relative to the map from the location provided via the location input field to another location upon the map, wherein the indication that previously marked the location provided via the location input field no longer marks the location provided via the location input field after being repositioned to the another location;
determining, by scheduling circuitry, the another location as represented by the indication upon the map displayed by the map view user interface; and
associating the determined location with the calendar entry.

2. The method of claim 1, wherein causing the first user interface to be displayed comprises causing the first user interface to be displayed in response to creation of the calendar entry.

3. The method of claim 1, wherein:
determining the another location comprises determining the another location based at least in part on a location search term entered into the location input field and user input that causes the indication to be repositioned upon the map.

4. The method of claim 3, wherein determining the another location based at least in part on the location search term comprises:
determining the search term;
determining one or more location search results based on the search term;
causing the determined one or more location search results to be displayed; and
determining the another location based upon the displayed one or more location search results and user input that causes the indication associated with a respective location search result to be repositioned upon the map.

5. The method of claim 1, wherein:
determining the another location comprises determining the another location selected on the map.

6. The method of claim 1, wherein the first user interface comprises a list of one or more locations and a button for selecting the map view user interface, and wherein the method further comprises:
determining a selection of the button;
wherein causing display of the map view user interface comprises causing display of the map view user interface in response to the selection of the button, the map view user interface comprising the larger and differently positioned view of the portion of the map without display of the list of one or more locations.

7. The method of claim 1, wherein the location comprises one or more of an address or position coordinates.

8. The method of claim 1, wherein causing display of the first user interface comprises causing display of the portion of the map having a predefined display radius from a center point as determined by scheduling circuitry based on the location provided via the location input field.

9. The method of claim 1, further comprising causing an event reminder to be provided in relation to the calendar entry based upon an estimated time for travel from a current position to the location associated with the calendar entry.

10. An apparatus comprising at least one processor and at least one memory storing computer program code, wherein the at least one memory and stored computer program code are configured, with the at least one processor, to cause the apparatus to at least:
cause display of a first user interface to facilitate scheduling an event, wherein the first user interface comprises a location input field for selecting a location associated with a calendar entry, wherein the first user interface also comprises a portion of a map based on a location provided via the location input field and an indication upon the map of the location provided via the location input field, wherein causing display of the first user interface also comprises causing display of a user interface comprising a selectable list of one or more selectable locations including a predefined number of different locations most recently selected for calendar entries, and wherein the first user interface is configured to concurrently present the location input field, the selectable list, and the portion of the map
wherein the first user interface also comprises a portion of a map based on a location provided via the location input field an indication upon the map of the location provided via the location input field, and wherein the first user interface is configured to concurrently present the location input field, the selectable list, and the portion of the map;
while the first user interface is displayed, receive user selection of a map view user interface;
in response to the user selection of the map view user interface, cause display of the map view user interface that includes a larger and a differently positioned view of the portion of the map than displayed by the first user interface, wherein the map view user interface is caused to be displayed by causing display of the larger and differently positioned view of the portion of the map without display of the list of one or more selectable locations;
while the map view user interface is displayed, receive user input as a result of user interaction with the portion of the map that is displayed by the map view user interface and cause the indication to be repositioned upon the map displayed by the map view user interface in response to the user input such that the indication is moved relative to the map from the location provided via the location input field to another location upon the map, wherein the indication that previously marked the location provided via the location input field no longer marks the location provided via the location input field after being repositioned to the another location;

determine the another location as represented by the indication upon the map displayed by the map view user interface; and associate the determined location with the calendar entry.

11. The apparatus of claim 10, wherein the at least one memory and stored computer program code are configured, with the at least one processor, to cause the apparatus to cause the first user interface to be displayed in response to creation of the calendar entry.

12. The apparatus of claim 10, wherein the at least one memory and stored computer program code are configured, with the at least one processor, to cause the apparatus to:

determine the another location by determining the another location based at least in part on a location search term entered into the location input field and user input that causes the indication to be repositioned upon the map.

13. The apparatus of claim 12, wherein the at least one memory and stored computer program code are configured, with the at least one processor, to cause the apparatus to determine the another location based at least in part on the location search term by:

determining the search term;

determining one or more location search results based on the search term;

causing the determined one or more location search results to be displayed; and determining the another location based upon the displayed one or more location search results and user input that causes the indication associated with a respective location search result to be repositioned upon the map.

14. The apparatus of claim 10, wherein the at least one memory and stored computer program code are configured, with the at least one processor, to cause the apparatus to:

determine the another location by determining the another location selected on the map.

15. The apparatus of claim 10, wherein the first user interface comprises a list of one or more locations and a button for selecting the map view user interface;

wherein the at least one memory and stored computer program code are configured, with the at least one processor, to further cause the apparatus to determine a selection of the button; and cause the apparatus to cause display of the map view user interface in response to the selection of the button, the map view user interface comprising the larger and differently positioned view of the portion of the map without display of the list of one or more locations.

16. The apparatus of claim 10, wherein the apparatus comprises or is embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

17. The apparatus of claim 10, wherein the at least one memory and stored computer program code are configured, with the at least one processor, to cause the apparatus to cause display of the first user interface by causing display of the portion of the map having a predefined display radius from a center point as determined by scheduling circuitry based on the location provided via the location input field.

18. The apparatus of claim 10, wherein the at least one memory and stored computer program code are further configured, with the at least one processor, to cause the apparatus to cause an event reminder to be provided in relation to the calendar entry based upon an estimated time for travel from a current position to the location associated with the calendar entry.

19. A computer program product comprising at least one non-transitory computer-readable storage medium having computer-readable program instructions stored therein, the computer-readable program instructions comprising:

program instructions configured to cause display of a first user interface to facilitate scheduling an event, wherein the first user interface comprises a location input field for selecting a location associated with a calendar entry, wherein causing display of the first user interface also comprises causing display of a user interface comprising a selectable list of one or more selectable locations including a predefined number of different locations most recently selected for calendar entries, and wherein the first user interface also comprises a portion of a map based on a location provided via the location input field and an indication upon the map of the location provided via the location input field, and wherein the first user interface is configured to concurrently present the location input field, the selectable list, and the portion of the map;

program instructions configured to receive, while the first user interface is displayed, user selection of a map view user interface;

program instructions configured to cause display of the map view user interface in response to the user selection of the map view user interface, wherein the map view user interface includes a larger and a differently positioned view of the portion of the map than displayed by the first user interface, wherein the map view user interface is caused to be displayed by causing display of the larger and differently positioned view of the portion of the map without display of the list of one or more selectable locations;

program instructions configured to receive, while the map view user interface is displayed, user input as a result of user interaction with the portion of the map that is displayed by the map view user interface and cause the indication to be repositioned upon the map displayed by the map view user interface in response to the user input such that the indication is moved relative to the map from the location provided via the location input field to another location upon the map, wherein the indication that previously marked the location provided via the location input field no longer marks the location provided via the location input field after being repositioned to the another location;

program instructions configured to determine the another location as represented by the indication upon the map displayed by the map view user interface; and program instructions configured to associate the determined location with the calendar entry.

20. The computer program product of claim 19, wherein the first user interface comprises a list of one or more locations and a button for selecting the map view user interface, and wherein the program instructions configured to cause display of the map view user interface comprise program instructions configured to:

determine a selection of the button;

cause display of the map view user interface in response to the selection of the button, the map view user interface comprising the larger and differently positioned view of the portion of the map without display of the list of one or more locations.

* * * * *